(12) United States Patent
Decker et al.

(10) Patent No.: US 12,540,874 B2
(45) Date of Patent: Feb. 3, 2026

(54) SNIFFER PROBE HAVING A BYPASS OPENING, FOR A GAS LEAK DETECTOR

(71) Applicant: INFICON GmbH, Cologne (DE)

(72) Inventors: Silvio Decker, Cologne (DE); Sebastian Weiss, Cologne (DE)

(73) Assignee: INFICON GmbH, Cologne (DE)

( * ) Notice: Subject to any disclaimer, the term of this patent is extended or adjusted under 35 U.S.C. 154(b) by 233 days.

(21) Appl. No.: 18/020,554

(22) PCT Filed: Jul. 8, 2021

(86) PCT No.: PCT/EP2021/069029
§ 371 (c)(1),
(2) Date: Feb. 9, 2023

(87) PCT Pub. No.: WO2022/037845
PCT Pub. Date: Feb. 24, 2022

(65) Prior Publication Data
US 2023/0296466 A1   Sep. 21, 2023

(30) Foreign Application Priority Data

Aug. 17, 2020   (DE) .......................... 102020210442.5

(51) Int. Cl.
*G01M 3/04* (2006.01)

(52) U.S. Cl.
CPC ..................... *G01M 3/04* (2013.01)

(58) Field of Classification Search
CPC ................. G01M 3/04; G01M 3/205
See application file for complete search history.

(56) References Cited

U.S. PATENT DOCUMENTS

| 2006/0220886 A1 | 10/2006 | Robertson | |
|---|---|---|---|
| 2008/0276692 A1* | 11/2008 | Wetzig | G01M 3/205 73/40.7 |
| 2009/0188302 A1* | 7/2009 | Rolff | G01M 3/207 73/40.7 |

(Continued)

FOREIGN PATENT DOCUMENTS

| DE | 102007043382 A1 | 3/2009 | |
|---|---|---|---|
| DE | 102008008262 A1 * | 8/2009 | G01M 3/202 |

(Continued)

*Primary Examiner* — Kristina M Deherrera
*Assistant Examiner* — Gedeon M Kidanu
(74) *Attorney, Agent, or Firm* — Kirton McConkie; Whitney Blair

(57) ABSTRACT

A sniffer probe for a gas leak detector, which gas leak detector has a vacuum pump for drawing in gas through the sniffer probe in accordance with the sniffing principle and a gas detector for analyzing the gas flow drawn in, the sniffer probe comprising: a gas inlet for the gas flow drawn in, a gas outlet, which can be connected to the gas leak detector, and a channel, which gas-conductingly connects the gas inlet to the gas outlet, is characterized in that the sniffer probe has a bypass opening, which gas-conductingly connects a portion of the channel located between the gas inlet and the gas outlet to the outer environment of the sniffer probe, the bypass opening having an actuatable closure for selectively opening and closing the bypass opening.

9 Claims, 2 Drawing Sheets

(56) References Cited

U.S. PATENT DOCUMENTS

| | | | |
|---|---|---|---|
| 2009/0193876 A1* | 8/2009 | Wetrzig | G01M 3/202 |
| | | | 73/40.7 |
| 2013/0213114 A1* | 8/2013 | Wetzig | G01N 25/20 |
| | | | 73/25.03 |
| 2019/0211378 A1 | 7/2019 | Apte et al. | |
| 2021/0239562 A1 | 8/2021 | Ruth et al. | |

FOREIGN PATENT DOCUMENTS

| | | |
|---|---|---|
| DE | 102013217279 A1 | 3/2015 |
| JP | 60-133340 | 7/1985 |
| JP | 05-055040 | 7/1993 |
| JP | 2008/101957 | 5/2008 |
| JP | 2008-541077 | 11/2008 |
| JP | 2011/511294 | 4/2011 |
| WO | 2015/090532 A1 | 6/2015 |

* cited by examiner

SNIFFER PROBE HAVING A BYPASS OPENING, FOR A GAS LEAK DETECTOR

RELATED APPLICATIONS

This application is a National Stage of International Application No. PCT/EP2021/069029, filed Jul. 8, 2021, and entitled SNIFFER PROBE HAVING A BYPASS OPENING, FOR A GAS LEAK DETECTOR, which claims priority to German Patent Application No. DE 10 2020 210 442.5, filed Aug. 17, 2020, which are each incorporated herein by reference in their entirety.

BRIEF DESCRIPTION OF THE DRAWINGS

Embodiments of the disclosure will be explained in more detail hereunder with reference to the Figures. In the Figures.

DETAILED DESCRIPTION

Figure 1:
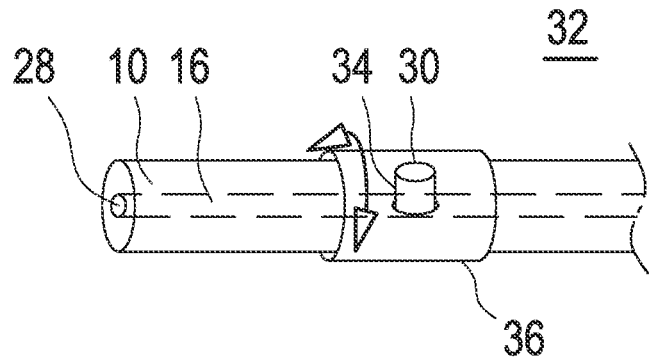
FIG. 1 shows a first embodiment with the bypass opening closed.

The disclosure relates to a sniffer probe for a gas leak detector having a vacuum pump for drawing gas through the sniffer probe according to the sniffing principle and a gas detector for analyzing the drawn gas flow. Such gas leak detectors are also referred to as sniffer gas leak detectors. The vacuum pump is designed to draw gas from the atmosphere through the gas inlet and to supply it to the gas detector.

To this end, the sniffer probe has the gas inlet for the drawn gas flow and a gas outlet connectable to the gas leak detector, through which the gas is supplied to the gas leak detector and the gas detector. In addition, the sniffer probe has a channel connecting the gas inlet to the gas outlet in a gas conducting manner. Here, the sniffer probe may be an integral part of the gas leak detector or may be detachably connectable to the gas leak detector as a separate element.

The larger the sniffer gas flow drawn through the gas inlet, i.e. the flow rate, the faster gas escaped from a leak of the test object to be examined can be detected and the greater the distance to a possible leak at which leaked gas can be detected, because the more gas volume is conveyed to the leak detector per unit time. On the other hand, a large gas flow makes the exact localization of leaks more difficult, because the space from which gas is drawn is all the larger, since the drawn gas volume is large. The larger the area from which the analyzed gas is drawn, the more gross or inaccurate the localization of a gas leak.

The accuracy of the localization of gas leaks can be increased by reducing the sniffing gas flow. However, this also increases the measured concentration of the leakage gas, and pressure changes often result at the leakage detection instrument.

It is an object of the disclosure to provide a sniffer probe which allows for a fast leak detection even at a greater distance from the gas leak and increases the accuracy of the localization of a leak.

The sniffer probe according to the disclosure is defined by the features of the independent claims 1 and 2, respectively.

Accordingly, a first variant of the disclosure provides that the sniffer probe comprises a bypass opening that connects a section of the channel located between the gas inlet and the gas outlet to the outer environment of the sniffer probe in a gas conducting manner, wherein the bypass opening has an actuatable closure for selectively opening and closing the bypass opening. When the bypass opening is closed, the flow through the suction opening is maximum so that a large gas volume is drawn through the gas inlet per unit time. This allows for a large distance between the leak and the gas inlet at which gas escaping from a leak can still be detected. However, the accuracy of the localization of a gas leak is reduced when the bypass opening is closed and can be increased by opening the bypass opening. As a result, a portion of the gas flow supplied to the detector is drawn through the bypass opening, while, compared to the case of the closed bypass opening, only a smaller portion of the gas flow supplied to the detector is drawn through the gas inlet. If the gas inlet is directed towards a leak, the volume in the area of the leak from which possible leakage gas is drawn is reduced compared to the case of the closed bypass opening, whereby the accuracy, i.e., in a sense, the spatial resolution, of the leakage detection is increased.

The bypass opening and/or the channel connecting the gas inlet to the gas outlet are preferably dimensioned and designed such that the total flow of the gas flows through the bypass opening and through the gas inlet when the bypass opening is open is essentially equal to the gas flow through the gas inlet when the bypass opening is closed. That is, the gas flow through the gas outlet when the bypass opening is open is essentially the same as that when the bypass opening is closed.

As an alternative to the first variant, the same technical effect can also be obtained according to a second variant by the sniffer probe comprising a bypass attachment that comprises a bypass gas inlet, a bypass gas outlet connectable to the gas inlet of the sniffer probe and a bypass channel connecting the bypass gas inlet to the bypass gas outlet in a gas conducting manner. The bypass attachment has the bypass opening that connects a section of the bypass channel located between the bypass gas inlet and the bypass gas outlet to the outer environment of the bypass attachment in a gas conducting manner. The bypass attachment can be detachably connected to the sniffer probe in such a manner that, in the connected state, the bypass gas outlet is connected to the gas inlet of the sniffer probe in a gas conducting manner.

In the second variant, the distance between the gas inlet or the bypass gas inlet and a leak, at which the gas detector can still detect gas escaped from a leak, is maximum when the bypass attachment is not connected to the sniffer probe. The spatial resolution of the detection of leakage gas, i.e. the accuracy of the localization of a leak, is maximum, when the bypass attachment is attached to the sniffer probe, so that the bypass gas outlet is connected to the gas inlet of the sniffer probe.

In the second variant, the bypass opening and/or the bypass channel are preferably dimensioned and designed such that the total flow of the gas flows through the bypass opening and through the bypass gas inlet when the bypass attachment is connected to the sniffer probe is essentially equal to the gas flow through the gas inlet of the sniffer probe when the bypass attachment is removed. In other words, this means that the gas flow at the gas outlet of the sniffer probe with the bypass attachment attached and the bypass opening open approximately corresponds to the gas flow when the bypass attachment is removed, and that the bypass attachment only has a negligible influence om this gas flow. In both variants of the disclosure, the term "essentially" should be understood such that the gas flow at the gas outlet of the sniffer probe varies by at most about 5% or at most about 10% when the bypass opening is opened and/or when the bypass attachment is attached. This may also be achieved, for example, by a suitable, possible variable flow throttle inside the channel or inside the bypass channel. Or the flow is essentially influences by the gas flow-throttling effect of the capillary line (flexible hose 26) between the handle and a sensor unit with a vacuum pump, so that the effect of an additional bypass opening on the total flow is negligible.

In both variants of the disclosure, the portion of the gas flow supplied to the detector which is drawn from the area of a leak, is at a maximum when the bypass opening is closed in the first variant and the bypass attachment is not connected to the sniffer probe in the second variant. In this case, the distance between the gas inlet and the leak, at which the detector can still detect gas escaped from the leak, is maximum. The user of the sniffer leak detector can selectively increase the spatial resolution of the localization of a gas leak, by opening the bypass opening in the first variant and by connecting the bypass attachment to the sniffer probe in the second variant.

Also in the second variant, it is conceivable that the bypass opening has an actuatable closure for selectively opening and closing the bypass opening. In this case, the closure is arranged at the bypass attachment.

Basically, the closure can be designed as a slider displaceable in the longitudinal direction of the channel or the bypass channel along the outer surface of the sniffer probe or the bypass attachment. The slider can surround the sniffer probe or the bypass attachment in an annular shape or as a ring section.

Advantageously, the bypass opening is arranged in a plane extending transversely to the main flow direction of the drawn gas in the channel or in the bypass channel. Thereby, the main flow direction from which gas is drawn through the bypass opening is different from the main flow direction in which gas is drawn through the gas inlet or the bypass gas inlet. This has the advantage that no gas is drawn through the bypass opening from the area of the leak, when the gas inlet or the bypass gas inlet is directed towards a leak.

This effect can alternatively or additionally be achieved by the distance of the bypass opening from the gas inlet or the bypass gas inlet being at least about 0.5 cm or at least about 2 cm. According to one example of the disclosure, this distance may be in a range from 0.3 cm to 0.7 cm and preferably in a range from 0.4 cm to 0.6 cm and thus be about 0.5 cm. According to another example of the disclosure, this distance may be in a range from 1.8 cm to 2.2 cm and preferably in a range from 1.9 cm to 2.1 cm and thus be about 2 cm. According to yet another example, this distance may also be more than 2 cm.

As an alternative or in addition, the bypass opening should also be connected to the channel or the bypass channel via a gas conduction path whose central longitudinal axis is at an angle of at least about 45° to the central longitudinal axis of the channel or the bypass channel, and is preferably in a range between 60° and 120° and, as is particularly preferred, in a range between 80° and 100°. The gas conduction path connecting the bypass opening to the channel or the bypass channel is then arranged approximately transversely to the channel or the bypass channel. This also has the effect that gas is drawn through the bypass opening from another area than through the gas inlet or the bypass gas inlet, so that possibly no leakage gas is drawn through the bypass opening when the gas inlet or the bypass gas inlet is directed towards a leak.

According to one embodiment, the bypass opening is dimensioned such that the gas flow through the bypass opening is at least five times as large as the gas flow through the gas inlet in the first variant of the disclosure or through the gas inlet in the second variant of the disclosure.

The disclosure may also be seen in a combination of a sniffer probe of the type described and a gas leak detector of the type described.

In all embodiments, a sniffer probe 10 of a gas leak detector having a gas inlet 28, a gas outlet 26 and a channel 16 connecting the gas inlet 28 to the gas outlet 26 in a gas conducting manner. The sniffer probe of the disclosure may be an integral part of a gas leak detector, for example, in which the sniffer probe is connected to the gas leak detector through a hose. Alternatively, the sniffer probe kay be an element separate from the gas leak detector, in which the sniffer probe can be connected to the gas leak detector in a detachable manner.

Figure 4:
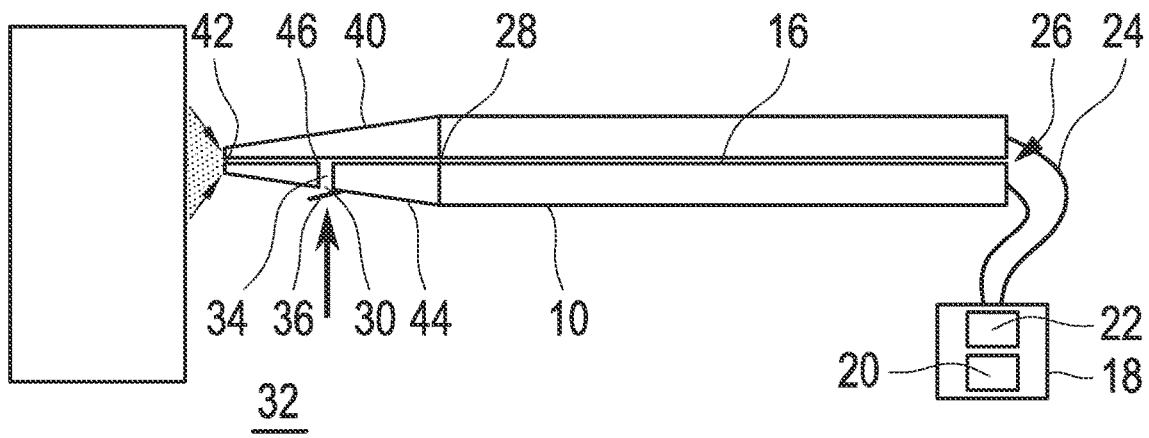
FIG. 4 shows a third embodiment with a bypass attachment connected to the sniffer probe and with the bypass opening opened.
Figure 5:
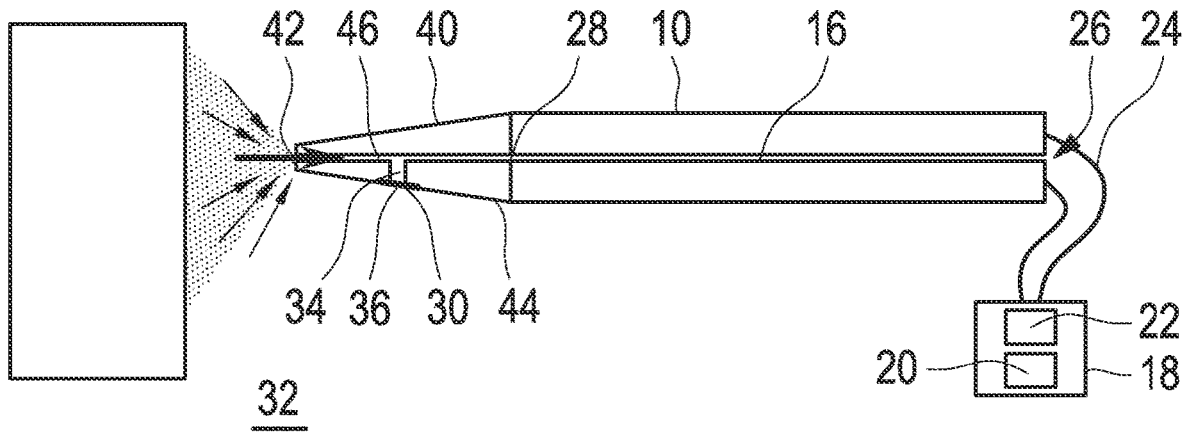
FIG. 5 shows the embodiment of FIG. 4 with the bypass opening closed.

The gas leak detector 18 is illustrated by way of example in FIGS. 4-5. The gas leak detector 18 has a vacuum pump 20 for drawing the gas and a gas detector 22 for analyzing the drawn gas. The gas detector 18 is connected in a gas conducting manner to the gas outlet 26 of the sniffer probe 10 via a flexible hose 24.

A gas conducting channel 16 connects the gas outlet 26 to the gas inlet 28 of the sniffer probe 10. The sniffer probe is an elongated rotationally symmetrical element, in which the gas inlet 28 and the gas outlet 26 are arranged at opposite end faces and are connected to each other in a gas conducting manner by the channel 16.

Figure 2:
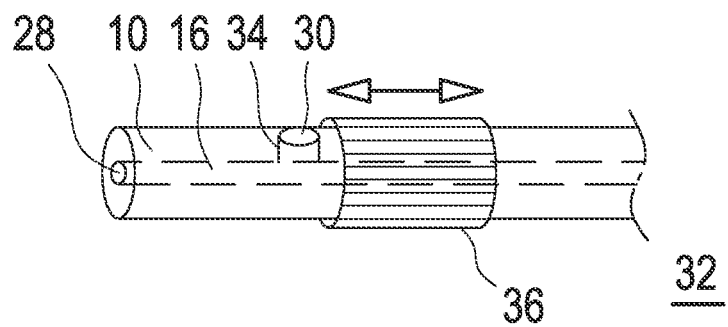
FIG. 2 shows the embodiment of FIG. 1 with the bypass opening opened.

In the first embodiment according to the FIGS. 1 and 2, the sniffer probe 10 is provided with a bypass opening 30 which connects a section of the channel 16 located between the gas inlet 28 and the gas outlet 26 to the outer environment 32 of the sniffer probe in a gas conducting manner, if the bypass opening 30 is not closed, as illustrated in FIG. 2. The bypass opening 30 is arranged in a plane that extends parallel to the central longitudinal axis of the channel 16 and parallel to the main flow direction of the gas conveyed through the channel 16. In addition, the central longitudinal axis of the gas conduction path 34 that connects the bypass opening 30 to the channel 16, is arranged transversely to the central longitudinal axis of the channel 16. As a result, when the bypass opening 30 is open, gas is drawn from another area through the bypass opening 30 than through the gas inlet 28 of the sniffer probe 10.

In the first embodiment, the bypass opening 30 can be closed using a slider 36 displaceable in the longitudinal direction of the sniffer probe 10 and the channel 16 along the outer shell surface of the sniffer probe 10, so as to close the bypass opening 30 as illustrated in FIG. 1 and to open it as illustrated in FIG. 2. In the first embodiment, the closure 36 is an annular slider that annularly surrounds the sniffer probe on the outside. Alternatively, the closure 36 may be a ring section, a planar plate or a flap, similar to that shown in FIGS. 3 and 4.

Figure 3:
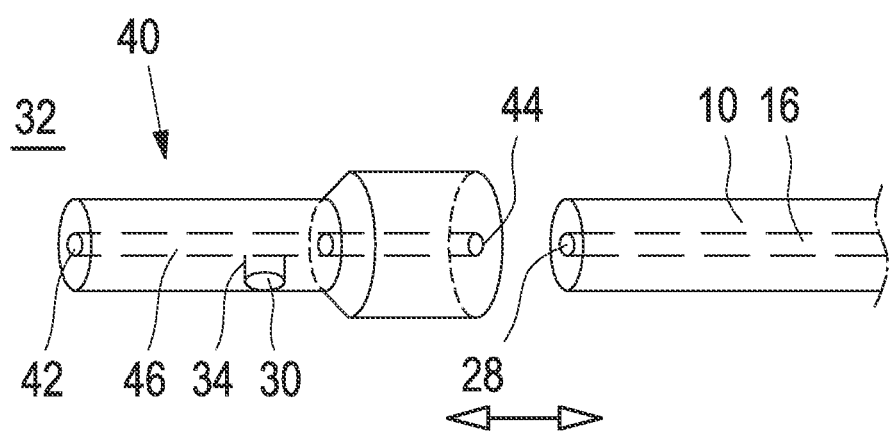
FIG. 3 shows a second embodiment with a bypass attachment in a state not connected to the sniffer probe.

The second embodiment of FIG. 3 differs from the first embodiment in that the bypass opening 30 is not provided on the sniffer probe 10, but at a bypass attachment 40 connectable to the gas inlet 28 of the sniffer probe 10. The bypass attachment 40 has a bypass gas inlet 42 and a bypass gas outlet 44, as well as a bypass channel 46 connecting the bypass gas inlet 42 to the bypass gas outlet 44 in a gas conducting manner.

The bypass attachment 40 is detachably connectable to the sniffer probe 10 as a pluggable element, by which, in the attached state, the bypass gas outlet 44 is connected to the gas inlet 28 of the sniffer probe 10 in a gas conducting manner.

In the second embodiment, the conduit section 34 is connected to the bypass channel 46. The conduit section 34 of the second embodiment is also arranged transversely to the longitudinal direction of the bypass channel 46. This means that the central longitudinal axis of the conduit section 34 extends transversely to the central longitudinal axis of the bypass channel 46. The bypass opening 30 is arranged in a plane that extends parallel to the main flow direction of the drawn gas in the bypass channel 46 and parallel to the central longitudinal axis of the bypass channel 46. Analogously, the bypass gas inlet is arranged in a plane that extends transversely to the plane of the bypass opening 30.

Similar to the second embodiment of FIG. 3, the third embodiment of FIGS. 4 and 5 corresponds to the second variant of the disclosure with the bypass attachment 40. The essential difference of the third embodiment with respect to the second embodiment is that the bypass opening 30 can selectively be opened and closed using an additional closure 36 in the form of a flap, similar to the closure of the first variant of the disclosure.

The invention claimed is:

1. A sniffer probe for a gas leak detector, which gas leak detector has a vacuum pump for drawing in gas flow through the sniffer probe in accordance with a sniffing principle and a gas detector for analyzing the gas flow drawn in, the sniffer probe comprising a gas inlet for the gas flow drawn in, a gas outlet, which can be connected to the gas leak detector, and a channel, which connects the gas inlet to the gas outlet in a gas conducting manner,
wherein
the sniffer probe has a bypass opening, which connects a section of the channel located between the gas inlet and the gas outlet to the outer environment of the sniffer probe in a gas conducting manner, the bypass opening having an actuatable closure for selectively opening and closing the bypass opening, such that when the bypass opening is open a portion of the gas flow supplied to the detector is drawn through the bypass opening while another portion of the gas flow supplied to the detector is drawn through the gas inlet.

2. A sniffer probe for a gas leak detector, which gas leak detector has a vacuum pump for drawing in gas flow through the sniffer probe in accordance with a sniffing principle and a gas detector for analyzing the gas flow drawn in, the sniffer probe comprising a gas inlet for the gas flow drawn in, a gas outlet, which can be connected to the gas leak detector, and a channel, which connects the gas inlet to the gas outlet in a gas conducting manner,
wherein
the sniffer probe comprises a bypass attachment that comprises a bypass gas inlet, a bypass gas outlet connectable to the gas inlet of the sniffer probe and a bypass channel connecting the bypass gas inlet to the bypass gas outlet in a gas conducting manner,
the bypass attachment comprising a bypass opening which connects a section of the bypass channel located between the bypass gas inlet and the bypass gas outlet to the outer environment of the bypass attachment in a gas conducting manner, and the bypass attachment being detachably connectable to the sniffer probe in such a manner that, in the connected state, the bypass gas outlet is connected to the gas inlet of the sniffer probe in a gas conducting manner, such that when the bypass opening is open a portion of the gas flow supplied to the detector is drawn through the bypass opening while another portion of the gas flow supplied to the detector is drawn through the gas inlet.

3. The sniffer probe according to claim 1, wherein one or both of the bypass opening and the channel are dimensioned such that, when the bypass opening is opened, the total flow of the gas flows through the bypass opening and through the gas inlet is essentially equal to the gas flow through the gas inlet when the bypass opening is closed.

4. The sniffer probe according to claim 2, wherein one or both of the bypass opening and the bypass channel are dimensioned such that, when the bypass attachment is connected, the total flow of the gas flows through the bypass opening and through the gas inlet is essentially equal to the gas flow through the gas inlet when the bypass attachment is removed.

5. The sniffer probe according to claim 1 or claim 2, wherein the bypass opening is arranged in a plane that extends parallel to the main flow direction of the drawn gas in the channel or in the bypass channel.

6. The sniffer probe according to claim 1 or claim 2, wherein the closure is a slider displaceable in the longitudinal direction of the channel along the outer surface of the sniffer probe or the bypass attachment.

7. The sniffer probe according to claim 6, wherein the slider surrounds the sniffer probe or the bypass attachment on the outside in an annular shape or as a ring section.

8. The sniffer probe according to claim 1 or claim 2, wherein the bypass opening is arranged at a distance of approximately or at least about 0.5 cm or at least about 2 cm from the gas inlet or from the bypass gas inlet.

9. The sniffer probe according to claim 1 or claim 2, wherein the bypass opening is dimensioned such that the gas flow through the bypass opening is at least approximately five times the gas flow through the gas inlet.

* * * * *